United States Patent [19]
Nakamura

[11] Patent Number: 5,396,289
[45] Date of Patent: Mar. 7, 1995

[54] SOLID STATE IMAGING DEVICE
[75] Inventor: Tsutomu Nakamura, Ina, Japan
[73] Assignee: Olympus Optical Co., Ltd., Tokyo, Japan
[21] Appl. No.: 86,468
[22] Filed: Jul. 6, 1993

Related U.S. Application Data
[63] Continuation of Ser. No. 716,885, Jun. 18, 1991, abandoned.

[30] Foreign Application Priority Data
Jun. 20, 1990 [JP] Japan .................. 2-159844

[51] Int. Cl.$^6$ .................. H04N 5/335; H04N 3/14
[52] U.S. Cl. .................. 348/294; 348/302; 348/243; 348/230
[58] Field of Search ........... 358/213.4, 213.12, 213.13, 358/213.15, 213.16, 213.18, 213.19, 213.23

[56] References Cited
U.S. PATENT DOCUMENTS

| | | | |
|---|---|---|---|
| 4,531,156 | 7/1985 | Nishizawa et al. | 358/213.15 |
| 4,684,992 | 8/1987 | Nakamura et al. | 358/213.12 |
| 4,700,231 | 10/1987 | Matsumoto | 358/213.16 |
| 4,862,276 | 8/1989 | Wang et al. | 358/213.31 |
| 4,929,994 | 5/1990 | Matsumoto | 357/30 |
| 4,974,008 | 11/1990 | Nakayama et al. | 354/402 |

Primary Examiner—Michael T. Razavi
Assistant Examiner—Bipin Shalwala
Attorney, Agent, or Firm—Armstrong, Westerman, Hattori, McLeland & Naughton

[57] ABSTRACT

In a solid state imaging device having a group of pixels arrayed in the form of a matrix, after a vertical scanning circuit delivers a drive signal for one first switching element, a horizontal scanning circuit is driven to sequentially read out pixel signals from the respective pixels on one predetermined row line to a signal output line, and one second switching element connected to another row line, from which pixel signals have been read out one horizontal scanning period before the readout for the predetermined row line, is driven to reset the respective pixels connected to another said row line upon the driving of the horizontal scanning circuit. Both the readout and reset operations for the respective pixels are point-sequentially performed so that periods of time integrating the pixels at all the positions on the imaging device can be made equal to each other.

1 Claim, 10 Drawing Sheets

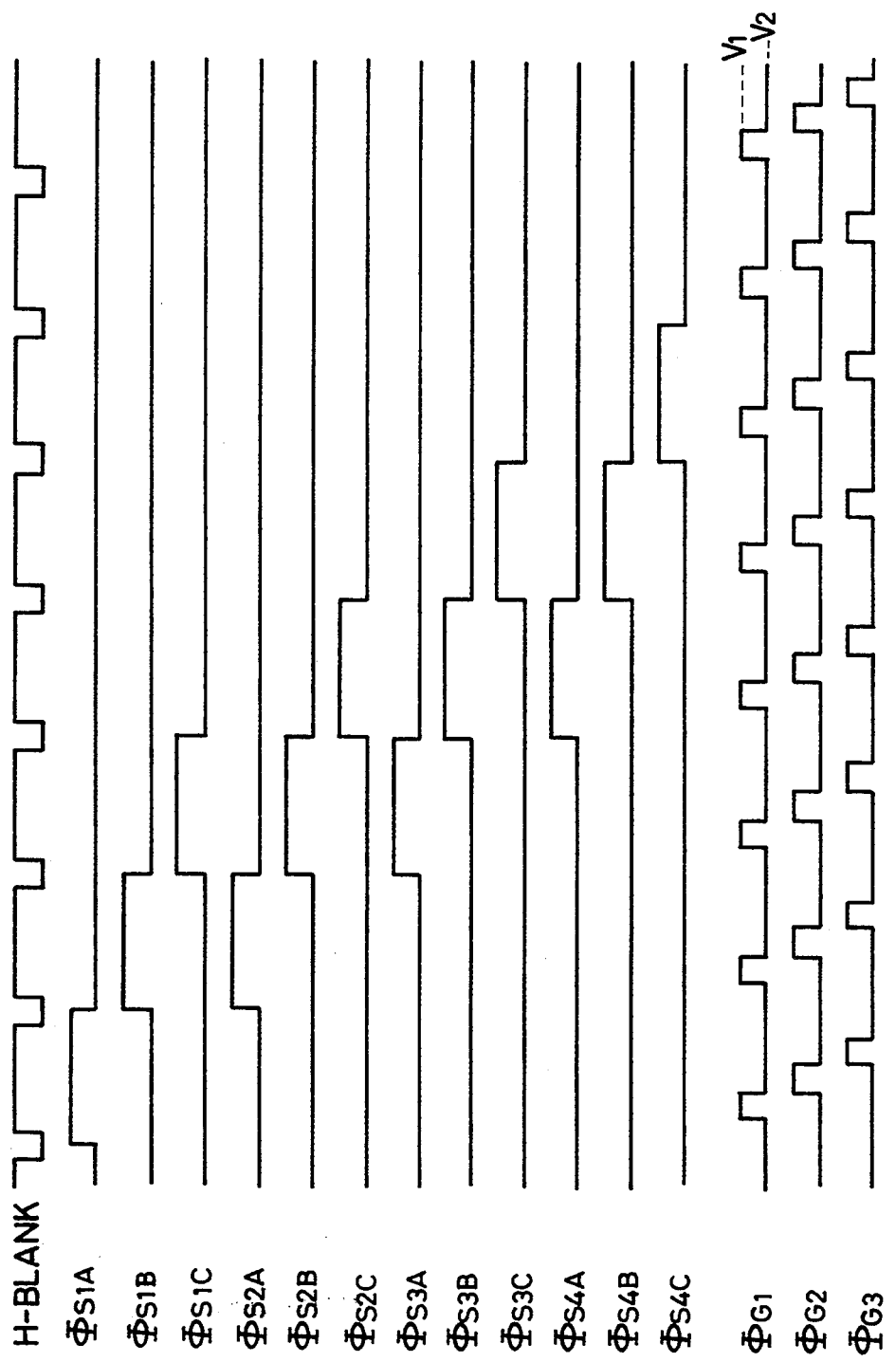

SOLID STATE IMAGING DEVICE

This application is a continuation of application Ser. No. 07/716,885, filed Jun. 18, 1991, now abandoned.

BACKGROUND OF THE INVENTION

This invention relates to a solid state imaging device using, as pixel constituting elements, image sensors such as Charge Modulation Devices (hereinafter abbreviated as CMDs) in each of which a source-drain current is modulated depending on an amount of electric charges produced under light irradiation and integrated below a gate electrode.

While there have been conventionally known a variety of solid state imaging devices comprised of image sensors having MIS-type light receiving and integrating portions, one of those solid state imaging devices employs image sensors having MIS-type light receiving and integrating portions and also an internal amplifying function. One example of such a solid state imaging device using CMD image sensors has been proposed by the applicant of this application, and is disclosed in Japanese Patent Laid-Open No. 60-206063 and a paper entitled "A New MOS Image Sensor Operating in a Non-Destructive Readout Mode", pp. 353–356, Proceedings of International Electron Device Meeting (IEDM), 1986.

One example of arrangement of such a conventional solid state imaging device using CMD image sensors will be explained below with reference to a circuit diagram of FIG. 1. First, CMDs 101-11, 101-12, ..., 101-mn constituting respective pixels are arranged in the form of a matrix, and a video bias $V_{DD}$ (>0) is commonly applied to respective drains of the CMDs. Respective gate terminals of a group of CMDs in each row arrayed in the X-direction are commonly connected to corresponding one of row lines 102-1, 102-2, ..., 102-m, whereas respective source terminals of a group of CMDs in each column arrayed in the Y-direction are commonly connected to corresponding one of column lines 103-1, 103-2, ..., 103-n. The column lines 103-1, 103-2, ..., 103-n are commonly connected to a signal line 106 through column select transistors 104-1, 104-2, ..., 104-n, respectively, and also commonly connected to a reference line 107, in turn connected to GND (grounded), through non-select transistors 105-1, 105-2, ..., 105-n, respectively. The signal line 106 is connected to a current-voltage conversion type preamplifier 112 with its input terminal virtually grounded, so that a video signal of negative polarity is time-serially read out at an output terminal 109 of the preamplifier 112.

Meanwhile, the row lines 102-1, 102-2, ..., 102-m are connected to a vertical scanning circuit 110 and applied with signals $\Phi_{G1}, \Phi_{G2}, \ldots, \Phi_{Gm}$, respectively. Gate terminals of the column select transistors 104-1, 104-2, ..., 104-n are directly connected to a horizontal scanning circuit 111 and applied with signals $\Phi_{S1}, \Phi_{S2}, \ldots, \Phi_{Sm}$, respectively. Gate terminals of the non-select transistors 105-1, 105-2, ..., 105-n are connected to the horizontal scanning circuit 111 through inverters and applied with inverted ones of the signals $\Phi_{S1}, \Phi_{S2}, \ldots, \Phi_{Sm}$, respectively. The CMDs constituting the respective pixels are formed on the same substrate which is applied with substrate voltage $V_{SUB}$.

FIG. 2 is a chart of signal waveforms for explaining operation of the solid state imaging device using CMD image sensors shown in FIG. 1. The signals $\Phi_{G1}, \Phi_{G2}, \ldots, \Phi_{Gm}$ applied to the row lines 102-1, 102-2, ..., 102-m each comprise readout gate voltage $V_{RD}$, reset voltage $V_{RST}$, overflow voltage $V_{OF}$ and integrating voltage $V_{INT}$. Then, each non-selected row is applied with the integrating voltage $V_{INT}$ for a horizontal effective period of the video signal and the overflow voltage $V_{OF}$ for a horizontal blanking period, whereas each selected row is applied with the readout gate voltage $V_{RD}$ for the horizontal effective period of the video signal and the reset voltage $V_{RST}$ for the horizontal blanking period.

The signals $\Phi_{S1}, \Phi_{S2}, \ldots, \Phi_{Sn}$ applied to the gate terminals of the column select transistors 104-1, 104-2, ..., 104-n are signals for selecting the column lines 103-1, 103-2, ..., 103-n, of which voltage values are set in such a manner as to turn off the column select transistors 104-1, 104-2, ..., 104-n and on the non-select transistors 105-1, 105-2, ..., 105-n at a low level and turn on the column select transistors 104-1, 104-2, ..., 104-n and off the non-select transistors 105-1, 105-2, ..., 105-n at a high level. Signals produced under light irradiation from the respective CMD pixels are sequentially read out to the signal line 106 and amplified by the preamplifier 112 for delivery to the exterior. Note that denoted by H-BLANK in FIG. 2 is a signal indicating the timing of horizontal blanking period of the video signal.

The conventional solid state imaging device as stated above has however suffered from the following disadvantage because it is designed to reset the pixels connected to the selected rows during the horizontal blanking period. Specifically, while the reset operation to determine the start points of integrating time of the pixels is line-sequentially performed row by row during the horizontal blanking period, the readout operation corresponding to the end points of integrating time is point-sequentially performed for the pixels connected to each row line. This leads to a problem that the periods of integrating time are different depending on respective positions of the pixels arrayed in the form of a matrix on the solid state imaging device.

SUMMARY OF THE INVENTION

The present invention has been made to solve the above problem experienced in the conventional solid state imaging device, and has for its object to provide a solid state imaging device using CMDs or like image sensors, which can be operated in such a manner as to make periods of integrating time equal for pixels at all the positions on the solid state imaging device.

To achieve the above object, a solid state imaging device according to the present invention includes, as pixel constituting elements, image sensors in each of which a source-drain current is modulated depending on an amount of electric charges produced under light irradiation and integrated below a gate electrode, and comprises a pixel group prepared by arraying said pixels in the form of a matrix, a plurality of row lines to each of which are commonly connected sources of those pixels arrayed in the X-direction for each row, a plurality of column lines to each of which are commonly connected gates of those pixels arrayed in the Y-direction for each column, a horizontal scanning circuit for sequentially delivering a drive signal to said column lines, and a vertical scanning circuit for delivering first and second signals to sequentially drive first switching elements through each of which said row lines are each connected to a signal output line, and second switching elements through each of which said row lines are each connected to a reset line applied with reset potential, both said scanning circuits being arranged such that after said vertical scanning circuit delivers a drive signal for one of said first switching elements, said horizontal scanning circuit is driven to sequentially read out pixel signals from the respective pixels on one predetermined row line to said signal output line, and one of said second switching elements connected to another row line, from which pixel signals have been read out one horizontal scanning period before the readout for said predetermined row line, is driven to reset the respective pixels connected to another said row line upon the driving of said horizontal scanning circuit.

In a solid state imaging device thus arranged, one first switching element is driven in response to the first signal from the vertical scanning circuit for connection of the predetermined row line to the signal output line, following which the horizontal scanning circuit is driven to sequentially read out the pixel signals from the respective pixels connected to the predetermined row line to the signal output line. At the same time, one second switching element connected to another row line, corresponding to a pixel line from which the pixel signals have been read out one horizontal scanning period before the readout, is driven in said second signal from the vertical scanning circuit, thereby connecting another said row line to the reset line. Then, the respective pixels connected to another said row line are sequentially reset upon the driving of the horizontal scanning circuit.

As a result, both the readout and reset operations for the respective pixels are point-sequentially performed so that periods of time integrating the pixels at all the positions on the imaging device can be made equal to each other.

BRIEF DESCRIPTION OF THE DRAWINGS

FIG. 10 is a chart of signal waveforms for explaining operation of the solid state imaging device in FIG. 9.

DESCRIPTION OF EMBODIMENTS OF THE INVENTION

Figure 3:
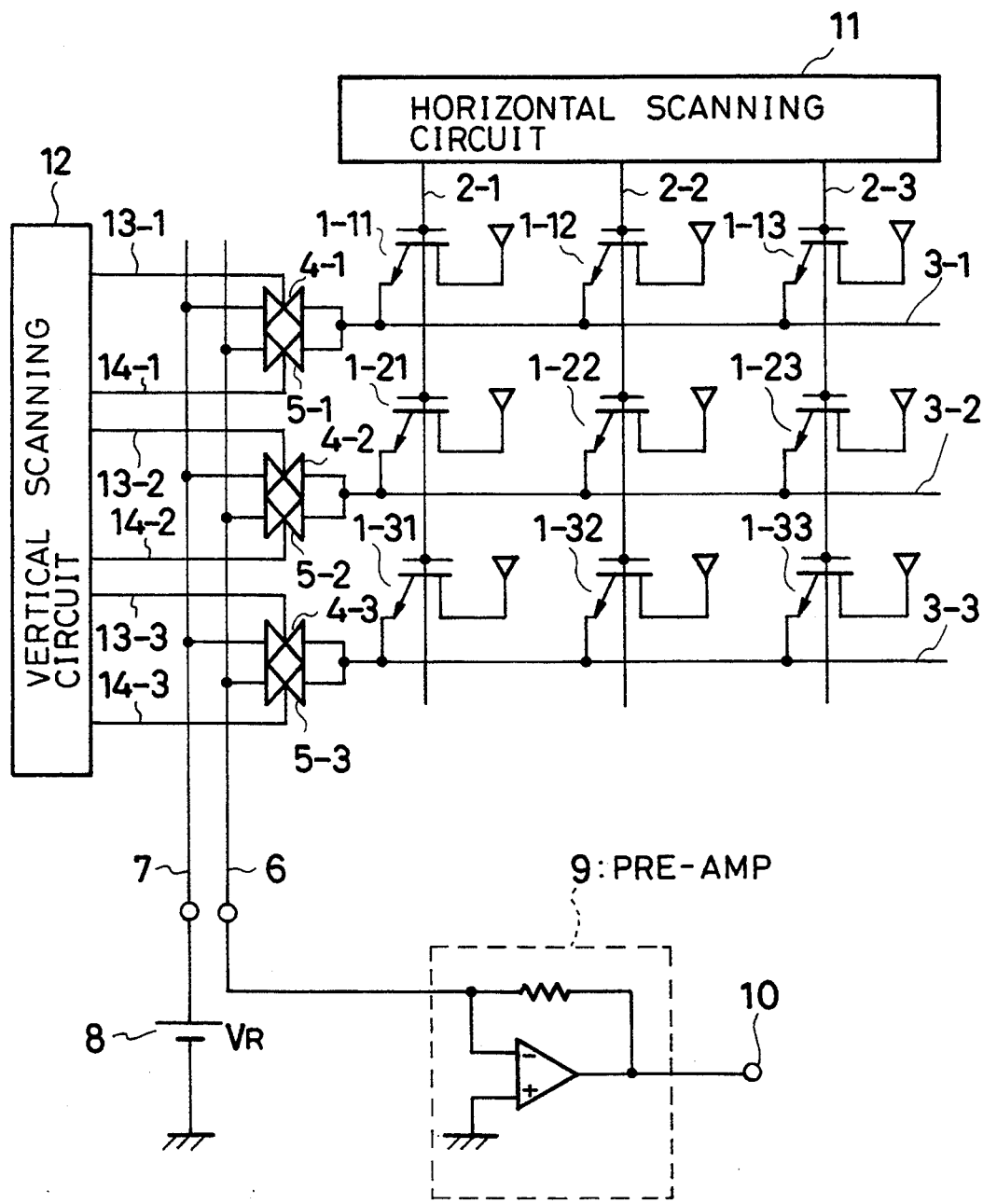
FIG. 3 is a circuit diagram showing a first embodiment of a solid state imaging device according to the present invention.

The following is a description of embodiments. FIG. 3 is a circuit diagram showing a first embodiment of a solid state imaging device according to the present invention. An arrangement of the device will be explained below with reference to FIG. 3. First, CMDs 1-11, 1-12, ..., 1-33 constituting respective pixels are arranged in the form of a matrix, and a not-shown video bias $V_{DD}(>0)$ is commonly applied to respective drains of the CMDs. Respective gate terminals of a group of CMDs in each column arrayed in the Y-direction are commonly connected to corresponding one of column lines 2-1, 2-2, 2-3, whereas respective source terminals of a group of CMDs in each row arrayed in the X-direction are commonly connected to corresponding one of row lines 3-1, 3-2, 3-3. The row lines 3-1, 3-2, 3-3 are commonly connected to a signal line 6 through signal read-out switches 5-1, 5-2, 5-3, respectively, and also commonly connected to a reset line 7, in turn connected to a power supply 8 for resetting, through reset switches 4-1, 4-2, 4-3, respectively. The signal line 6 is connected to a current-voltage conversion type preamplifier 9 with its input terminal virtually grounded, so that a video signal of negative polarity is time-serially read out at an output terminal 10 of the preamplifier 9.

Meanwhile, the column lines 2-1, 2-2, 2-3 are connected to a horizontal scanning circuit 11 and applied with signals $\Phi_{G1}$, $\Phi_{G2}$, $\Phi_{G3}$, respectively. Control terminals of the signal readout switches 5-1, 5-2, 5-3 and the reset switches 4-1, 4-2, 4-3 are connected to signal lines 14-1, 14-2, 14-3 and 13-1, 13-2, 13-3 from a vertical scanning circuit 12, respectively, and applied with signals $\Phi_{S1A}$, $\Phi_{S2A}$, $\Phi_{S3A}$, and $\Phi_{S1B}$, $\Phi_{S2B}$, $\Phi_{S3B}$, respectively. The CMDs are formed on the same substrate which is applied with substrate voltage $V_{SUB}$.

Figure 4:
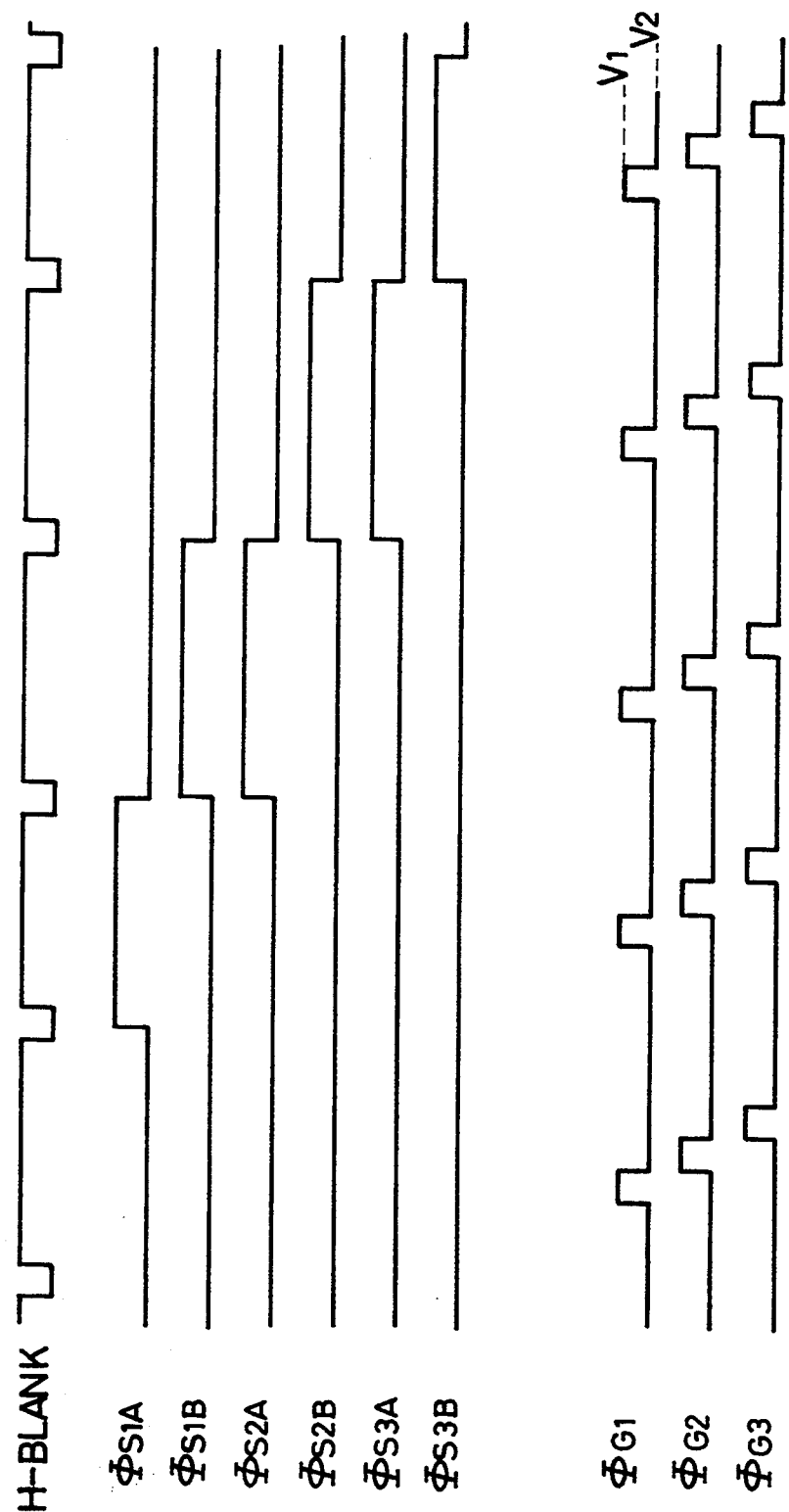
FIG. 4 is a chart of signal waveforms for explaining operation of the solid state imaging device in FIG. 3.

FIG. 4 is a chart of signal waveforms for explaining operation of the solid state imaging device using CMD pixels shown in FIG. 3. The signals $\Phi_{G1}$, $\Phi_{G2}$, $\Phi_{G3}$ applied to the column lines 2-1, 2-2, 2-3 each comprise column select voltage $V_1$ and column non-select voltage $V_2$. For the row line 3-1, the signal readout switch 5-1 is turned on during only a period in which the signal $\Phi_{S1A}$ is at a high level, so that the row line 3-1 is connected to the signal line 6 to become the GND potential, whereas it is turned off during a period in which the signal $\Phi_{S1A}$ is at a low level. On the other hand, the reset switch 4-1 is turned on during only a period in which the signal $\Phi_{S1B}$ is at a high level, so that the row line 3-1 is connected to the reset line 7 to become the same potential as potential $V_R$ (positive or negative) given by the power supply 8 for resetting, whereas it is turned off during a period in which the signal $\Phi_{S1B}$ is at a low level.

Figure 1:
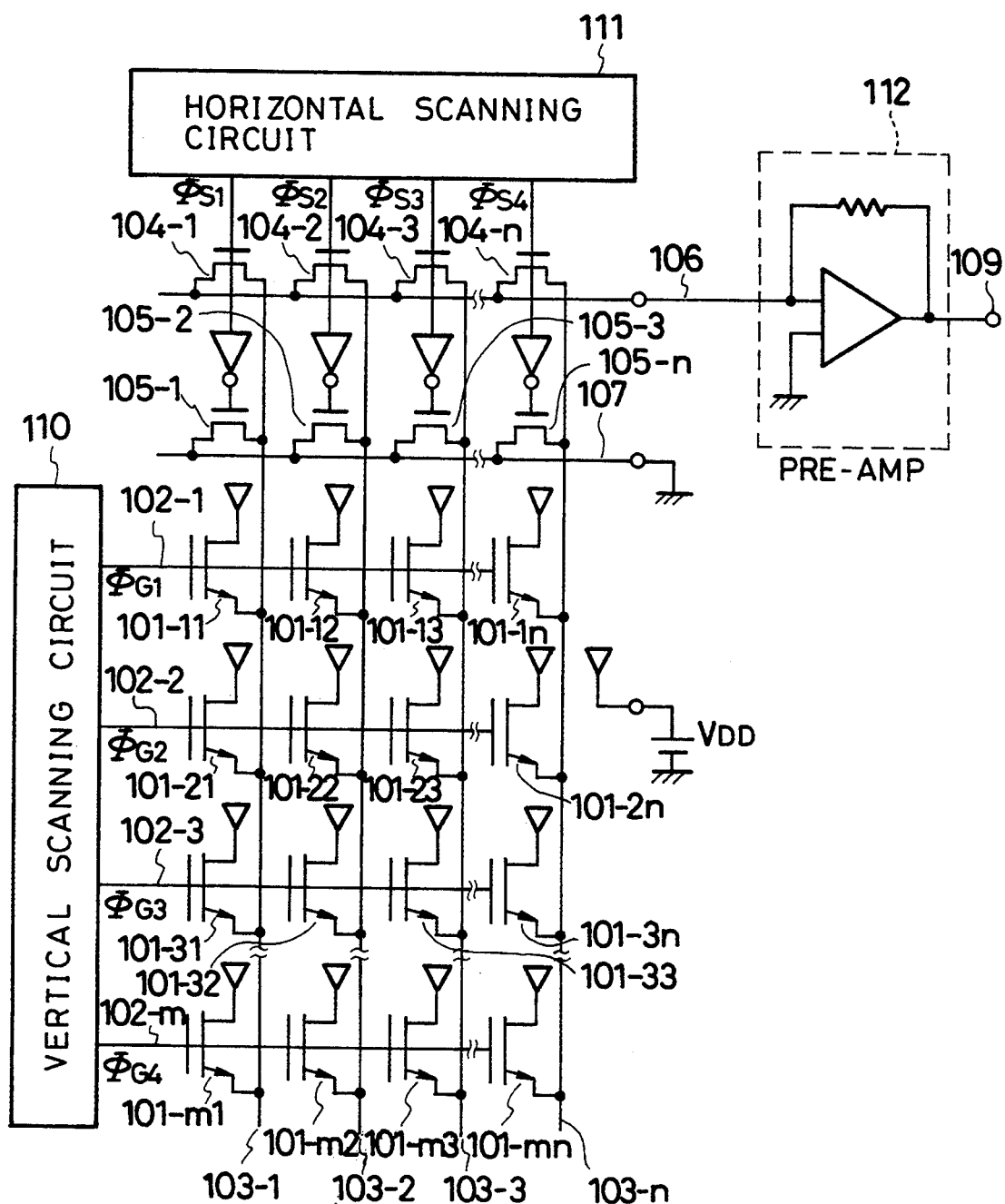
FIG. 1 is a circuit diagram showing arrangement of a conventional solid state imaging device.
Figure 2:
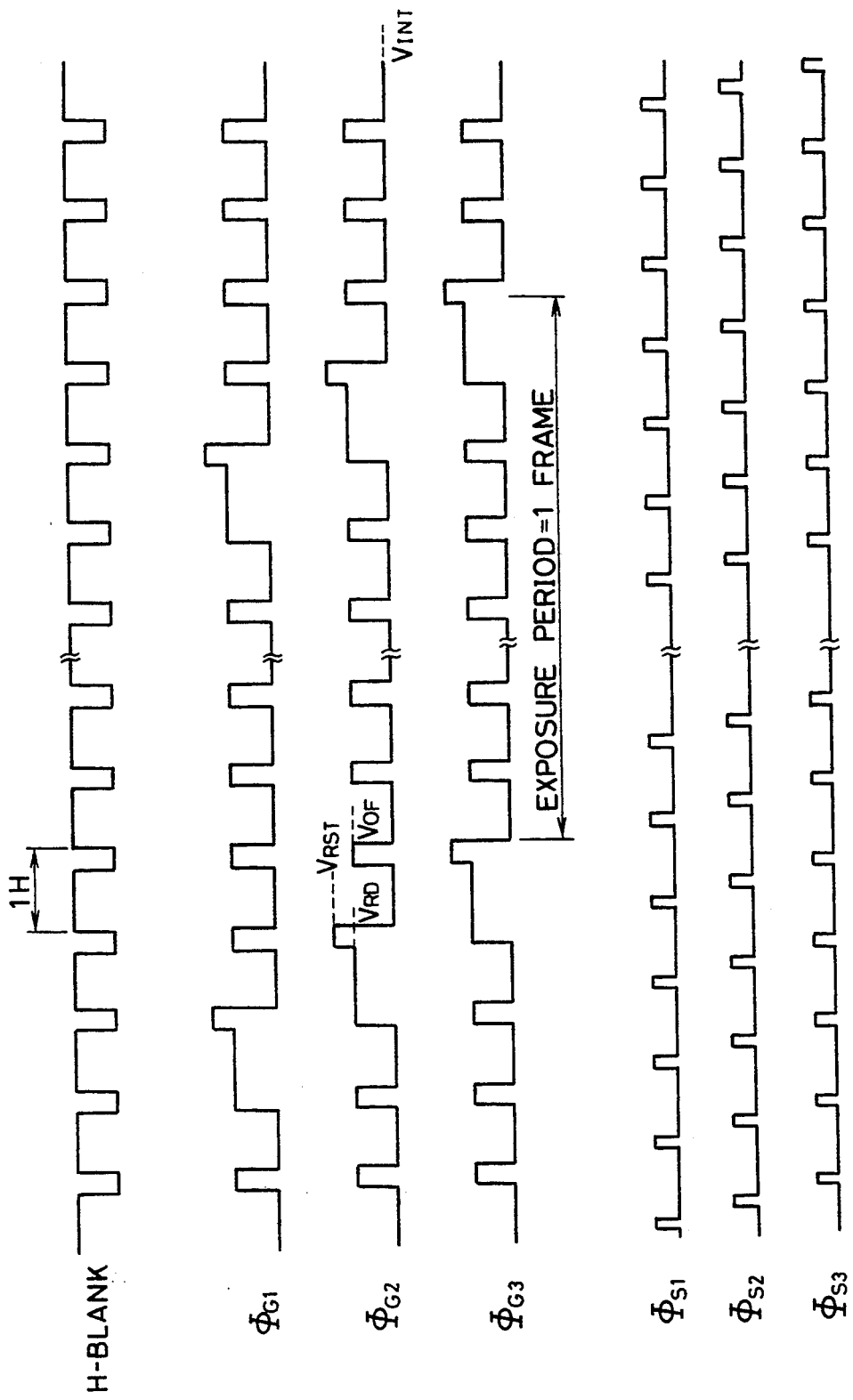
FIG. 2 is a chart of signal waveforms for explaining operation of the solid state imaging device in FIG. 1.

By way of example, when the signal $\Phi_{S1A}$ shifts from a low level to a high level in one horizontal blanking period, the signal readout switch 5-1 is turned on and the row line 3-1 is connected through the switch 5-1 and the signal line 6 to the preamplifier 9 with its input terminal virtually grounded. Therefore, the potential of the row line 3-1 takes 0 V so that the source terminals of the CMD pixels 1-11, 1-12, 1-13 connected to the row line 3-1 become the GND potential. Afterward, when the signal $\Phi_{G1}$ shifts from the column non-select voltage $V_2$ to the column select voltage $V_1$, a potential difference of $V_1$ is produced between gate and source of the CMD pixel 1-11. By setting the potential difference $V_1$ thus produced equal to the potential of the readout gate voltage $V_{RD}$ in the prior art shown in FIGS. 1 and 2, a signal current like that in the prior art is allowed to flow through the CMD pixel 1-11.

Meanwhile, of the CMD pixels connected to the row line 3-1, the gates of the CMD pixels 1-12, 1-13 other than the CMD pixel 1-11 are applied with the column non-select voltage $V_2$, thereby producing potential $V_2$ between gates and sources of the CMD pixels 1-12, 1-13 other than the CMD pixel 1-11. Accordingly, by setting the potential $V_2$ thus produced equal to the potential of the integrating voltage $V_{INT}$ in the prior art shown in FIGS. 1 and 2, the CMD pixels 1-12, 1-13 are cut off and no current flows through the CMDs constituting those pixels in a like manner to the prior art. As a result, only the signal current from the CMD pixel 1-11 is taken out to the signal line 6 through the row line 3-1. Thereafter, in response to state transition of the signals $\Phi_{G2}$, $\Phi_{G3}$, signals from the CMD pixels 1-12, 1-13 are successively taken out to the signal line 6.

When the signal $\Phi_{S1A}$ is changed from a high level to a low level in the subsequent horizontal blanking period, the signal readout switch 5-1 is turned off to disconnect the row line 3-1 from the signal line 6 of potential 0. At the same time, the signal $\Phi_{S1B}$ changes from a low level to a high level, whereupon the reset switch 4-1 is turned on and the row line 3-1 is connected to the power supply 8 through the reset line 7. Therefore, the source terminals of the CMD pixels 1-11, 1-12, 1-13 connected to the row line 3-1 at their sources take the potential $V_R$. Simultaneously, the signal $\Phi_{S2A}$ changes from a low level to a high level, whereupon the signal readout switch 5-2 is turned on and the row line 3-2 is connected through the signal line 6 to the preamplifier 9 with its input terminal virtually grounded. As a result, the source potentials of the CMD pixels 1-21, 1-22, 1-23 commonly connected to the row line 3-2 at their sources become 0V.

Following that, when the signal $\Phi_{G1}$ shifts from the column non-select voltage $V_2$ to the column select voltage $V_1$, a potential difference of $V_1 - V_R$ is produced between gate and source of the CMD pixel 1-11. By setting the potential difference $V_1 - V_R$ thus produced equal to the reset voltage $V_{RST}$ in the prior art shown in FIGS. 1 and 2, signal charges in the form of holes integrated below a gate electrode of the CMD pixel 1-11 are discharged and the CMD pixel 1-11 is reset similarly to the prior art.

On the other hand, the CMD pixel 1-21 connected to the row line 3-2 and selected by the column select pulse $\Phi_{G1}$ outputs a signal current depending on the exposure amount to the signal line 6 through the row line 3-2 and the switch 5-2. Then, when the signal $\Phi_{G1}$ shifts from the column select voltage $V_1$ to the column non-select voltage $V_2$ and the signal $\Phi_{G2}$ shifts from the column non-select voltage $V_2$ to the column select voltage $V_1$, the CMD pixel 1-12 is reset and a signal from the CMD pixel 1-22 is outputted to the signal line 6. After that, the similar operation will be repeated successively.

According to this embodiment, with such an arrangement that gates of CMD pixels in each column arrayed in the Y-direction are commonly connected to corresponding one of column lines for horizontal scanning of the column lines, whereas sources of CMD pixels in each row arrayed in the X-direction are commonly connected to corresponding one of row lines for vertical scanning of the row lines, both the reset operation of signal charges and the signal readout operation for each CMD pixel are point-sequentially performed. Consequently, periods of time integrating the signal charges becomes uniform for the pixels at any positions within the imaging device so that a good video signal can be obtained.

Figure 5:
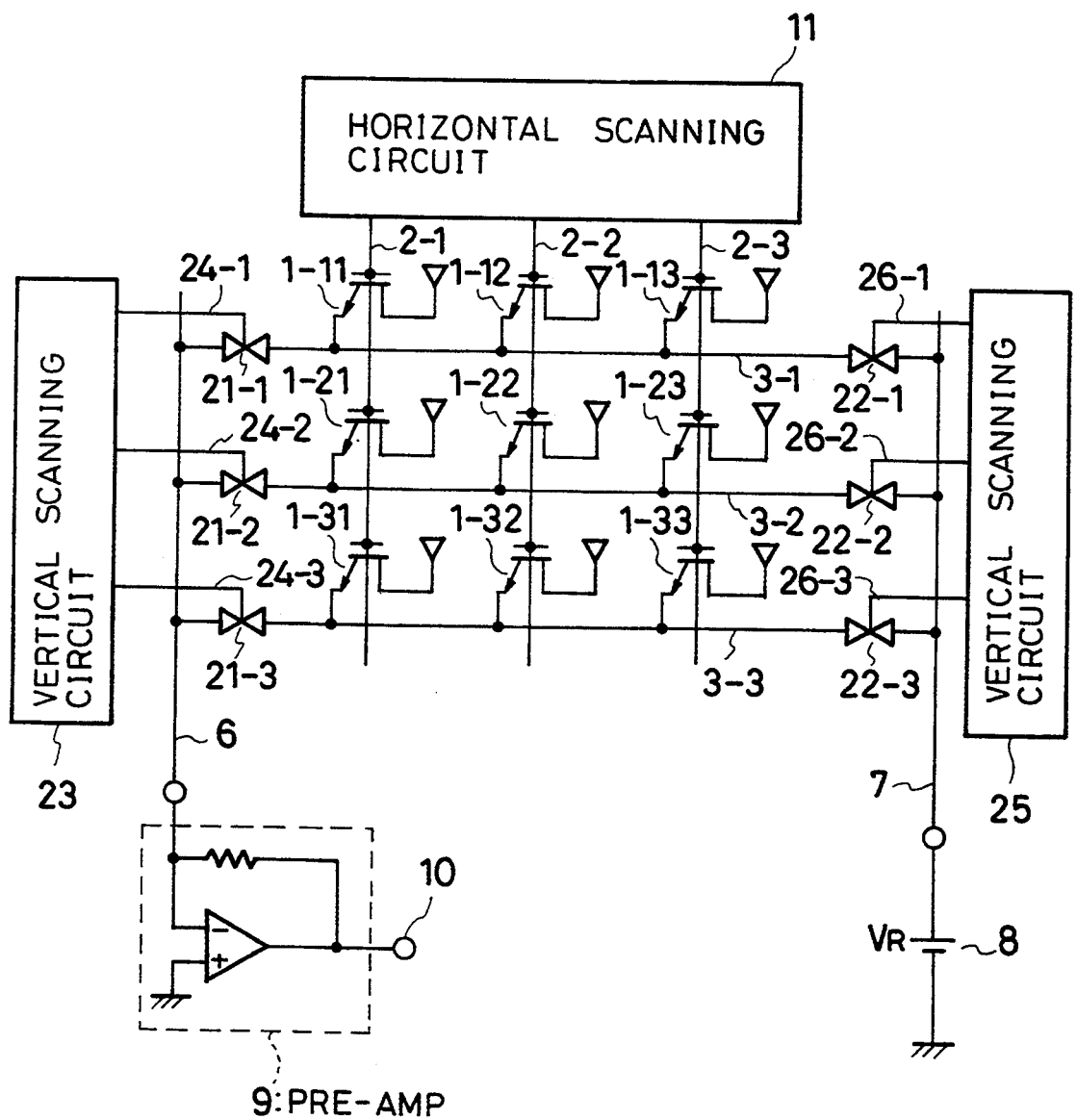
FIG. 5 is a circuit diagram showing a second embodiment.

FIG. 5 is a circuit diagram showing a second embodiment of the solid state imaging device according to the present invention. An arrangement of the device will be explained below with reference to FIG. 5. This embodiment is intended to provide a shutter function, and components having the same or identical functions as those in the above first embodiment are denoted by the same reference numerals.

As with the first embodiment, CMDs 1-11, 1-12, ..., 1-33 constituting respective pixels are arranged in the form of a matrix, and a not-shown video bias $V_{DD}(>0)$ is commonly applied to respective drains of the CMDs. Respective gate terminals of a group of CMDs in each column arrayed in the Y-direction are commonly connected to corresponding one of column lines 2-1, 2-2, 2-3, whereas respective source terminals of a group of CMDs in each row arrayed in the X-direction are commonly connected to corresponding one of row lines 3-1, 3-2, 3-3. The row lines 3-1, 3-2, 3-3 are commonly connected to a signal line 6 through signal readout switches 21-1, 21-2, 21-3, respectively, and also commonly connected to a reset line 7, in turn connected to a power supply 8 for resetting, through reset switches 22-1, 22-2, 22-3, respectively. The signal line 6 is connected to a current-voltage conversion type preamplifier 9 with its input terminal virtually grounded, so that a video signal of negative polarity is time-serially read out at an output terminal 10 of the preamplifier 9.

Meanwhile, the column lines 2-1, 2-2, 2-3 are connected to a horizontal scanning circuit 11 and applied with signals $\Phi_{G1}$, $\Phi_{G2}$, $\Phi_{G3}$, respectively. Control terminals of the signal readout switches 21-1, 21-2, 21-3 are connected to control signal lines 24-1, 24-2, 24-3 from a vertical scanning circuit 23 for reading out signals, and applied with signals $\Phi_{S1A}$, $\Phi_{S2A}$, $\Phi_{S3A}$, respectively. Control terminals of the reset switches 22-1, 22-2, 22-3 are connected to control signal lines 26-1, 26-2, 26-3 from a vertical scanning circuit 25 for resetting, and applied with signals $\Phi_{S1B}$, $\Phi_{S2B}$, $\Phi_{S3B}$, respectively. The CMDs are formed on the same substrate which is applied with substrate voltage $V_{SUB}$.

Figure 6:
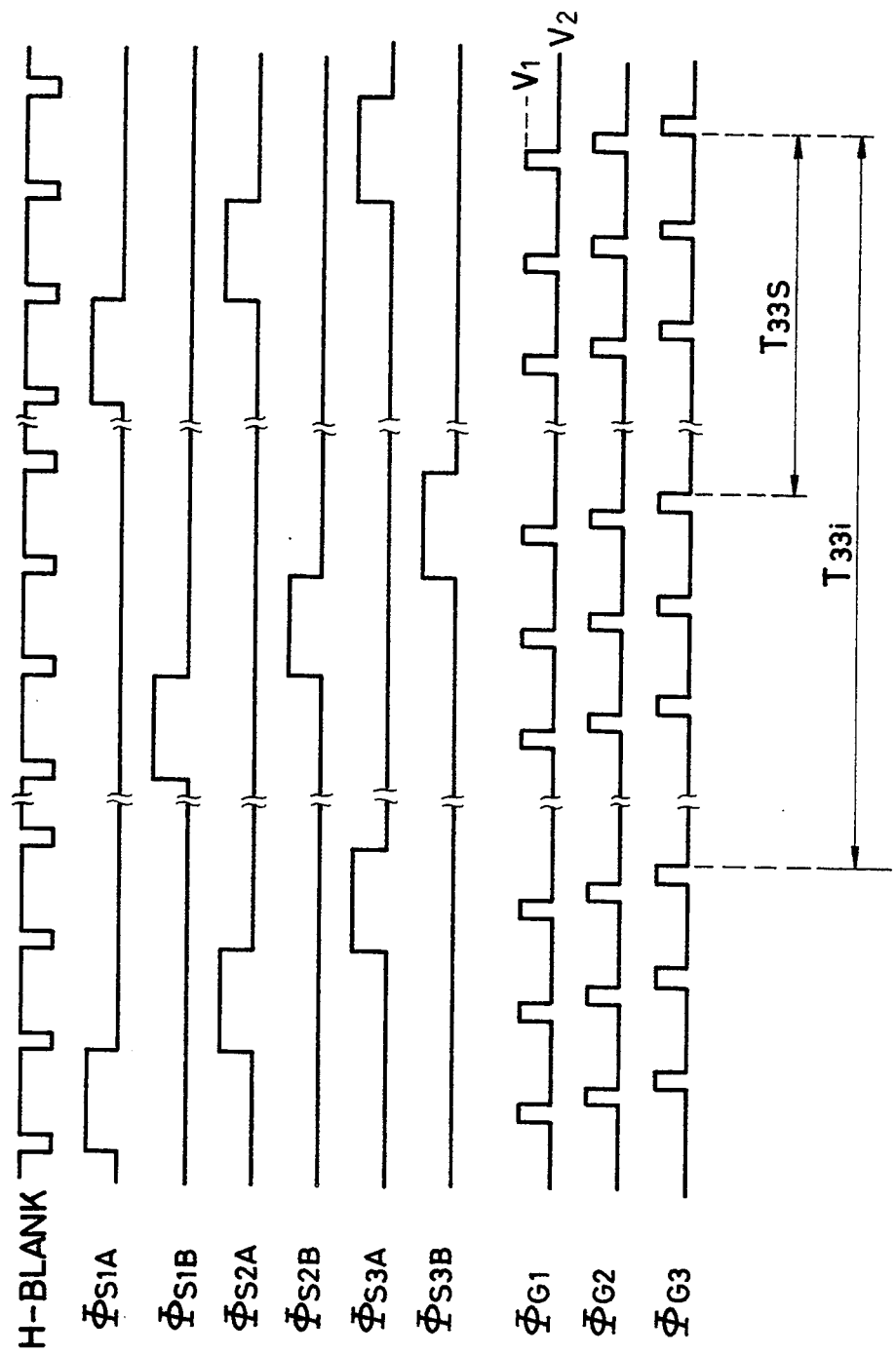
FIG. 6 is a chart of signal waveforms for explaining operation of the solid state imaging device in FIG. 5.

FIG. 6 is a chart of signal waveforms for explaining operation of the second embodiment shown in FIG. 5. The signals $\Phi_{G1}$, $\Phi_{G2}$, $\Phi_{G3}$ applied to the column lines 2-1, 2-2, 2-3 each comprise column select voltage $V_1$ and column non-select voltage $V_2$. For the row line 3-1, the signal readout switch 21-1 is turned on during only a period in which the signal $\Phi_{S1A}$ is at a high level, so that the row line 3-1 is connected to the signal line 6 to become the GND potential, whereas it is turned off during a period in which the signal $\Phi_{S1A}$ is at a low level. On the other hand, the reset switch 22-1 is turned on during only a period in which the signal $\Phi_{S1B}$ is at a high level, so that the row line 3-1 is connected to the reset line 7 to become the same potential as potential $V_R$ given by the power supply 8 for resetting, whereas it is turned off during a period in which the signal $\Phi_{S1B}$ is at a low level, thereby disconnecting the row line 3-1 from the reset line 7.

By way of example, when the signal $\Phi_{S1A}$ shifts from a low level to a high level in one horizontal blanking period, the signal readout switch 21-1 is turned on and the row line 3-1 is connected through the switch 21-1 and the signal line 6 to the preamplifier 9 with its input terminal virtually grounded. Therefore, the potential of the row line 3-1 takes 0V so that the source terminals of the CMD pixels 1-11, 1-12, 1-13 connected to the row line 3-1 become the GND potential. Afterward, when the signal $\Phi_{G1}$ shifts from the column non-select voltage $V_2$ to the column select voltage $V_1$, a potential difference of $V_1$ is produced between gate and source of the CMD pixel 1-11. By setting the potential difference $V_1$ thus produced equal to the potential of the readout gate voltage $V_{RD}$ in the prior art shown in FIGS. 1 and 2, a signal current like that in the prior art is allowed to flow through the CMD pixel 1-11.

Meanwhile, of the CMD pixels connected to the row line 3-1, the gates of the CMD pixels 1-12, 1-13 other than the CMD pixel 1-11 are applied with the column non-select voltage $V_2$, thereby producing potential $V_2$ between gates and sources of the CMD pixels 1-12, 1-13 other than the CMD pixel 1-11. Accordingly, by setting the potential $V_2$ thus produced equal to the potential of the integrating voltage $V_{INT}$ in the prior art shown in FIGS. 1 and 2, the CMD pixels 1-12, 1-13 are cut off and no current flows through the CMDs constituting those pixels in a like manner to the prior art. As a result, only the signal current from the CMD pixel 1-11 is taken out to the signal line 6 through the row line 3-1. Thereafter, in response to state transition of the signals $\Phi_{G2}$, $\Phi_{G3}$, signals from the CMD pixels 1-12, 1-13 are successively taken out to the signal line 6.

When the signal $\Phi_{S1A}$ is changed from a high level to a low level in the subsequent horizontal blanking period, the signal readout switch 21-1 is turned off to disconnect the row line 3-1 from the signal line 6 of potential 0. At the same time, the signal $\Phi_{S2A}$ changes from a low level to a high level, whereupon the signal readout switch 21-2 is turned on and the row line 3-2 is connected through the signal line 6 to the preamplifier 9 with its input terminal virtually grounded. Therefore, the source potentials of the CMD pixels 1-21, 1-22, 1-23 commonly connected to the row line 3-2 become 0V. Afterward, when the signal $\Phi_{G1}$ shifts from the column non-select voltage $V_2$ to the column select voltage $V_1$, the CMD pixel 1-21 connected to the row line 3-2 and selected by the column select pulse signal $\Phi_{G1}$ outputs a signal current depending on the exposure amount to the signal line 6 through the row line 3-2 and the switch 21-2 as stated above. Then, when the signal $\Phi_{G1}$ shifts from the column select voltage $V_1$ to the column non-select voltage $V_2$ and the signal $\Phi_{G2}$ shifts from the column non-select voltage $V_2$ to the column select voltage $V_1$, a signal current from the CMD pixel 1-22 is outputted to the signal line 6. Subsequently, the similar operation will be successively performed.

Next, when the signal $\Phi_{S1B}$ is changed from a low level to a high level, the reset switch 22-1 is turned on and the row line 3-1 is connected to the power supply 8 through the reset line 7. Therefore, the source terminals of the CMD pixels 1-11, 1-12, 1-13 connected to the row line 3-1 at their sources take the potential $V_R$. Following that, when the signal $\Phi_{G1}$ shifts from the column non-select voltage $V_2$ to the column select voltage $V_1$, a potential difference of $V_1 - V_R$ is produced between gate and source of the CMD pixel 1-11. By setting the potential difference $V_1 - V_R$ thus produced equal to the reset voltage $V_{RST}$ in the prior art shown in FIGS. 1 and 2, signal charges in the form of holes integrated below a gate electrode of the CMD pixel 1-11 are discharged and the CMD pixel 1-11 is reset similarly to the prior art. Then, when the signal $\Phi_{G1}$ shifts from the column select voltage $V_1$ to the column non-select voltage $V_2$ and the signal $\Phi_{G2}$ shifts from the column non-select voltage $V_2$ to the column select voltage $V_1$, the CMD pixel 1-12 is reset. Subsequently, the similar operation will be successively performed.

According to this embodiment, like the first embodiment, with such an arrangement that gates of CMD pixels in each column arrayed in the Y-direction are commonly connected to corresponding one of column lines for horizontal scanning of the column lines, whereas sources of CMD pixels in each row arrayed in the X-direction are commonly connected to corresponding one of row lines for vertical scanning of the row lines, both the reset operation of signal charges and the signal readout operation for each CMD pixel are point-sequentially performed. Consequently, periods of time integrating the signal charges becomes uniform for the pixels at any positions within the imaging device so that a good video signal can be obtained. Furthermore, while the exposure time in the first embodiment is fixed as indicated by $T_{33i}$ in FIG. 6, it can be set to a shorter period of exposure time as indicated by $T_{33S}$ in this embodiment. In other words, shutter operation can be achieved to set the integrating time to be integer times as long as the horizontal scanning period.

Moreover, although this embodiment has been explained as providing two separate vertical scanning circuits for reading out signals and resetting, the present invention is not limited to that arrangement. It is needless to say that the present invention is also applicable to such an arrangement as using a single vertical scanning circuit achieve the equivalent function, for example, as disclosed in Japanese Patent Application No. 1-264989. Thus, the gist of this embodiment resides in giving the interval between the changeover timings of the reset switch and the signal readout switch with a time difference integer times as long as the horizontal scanning period.

Figure 7:
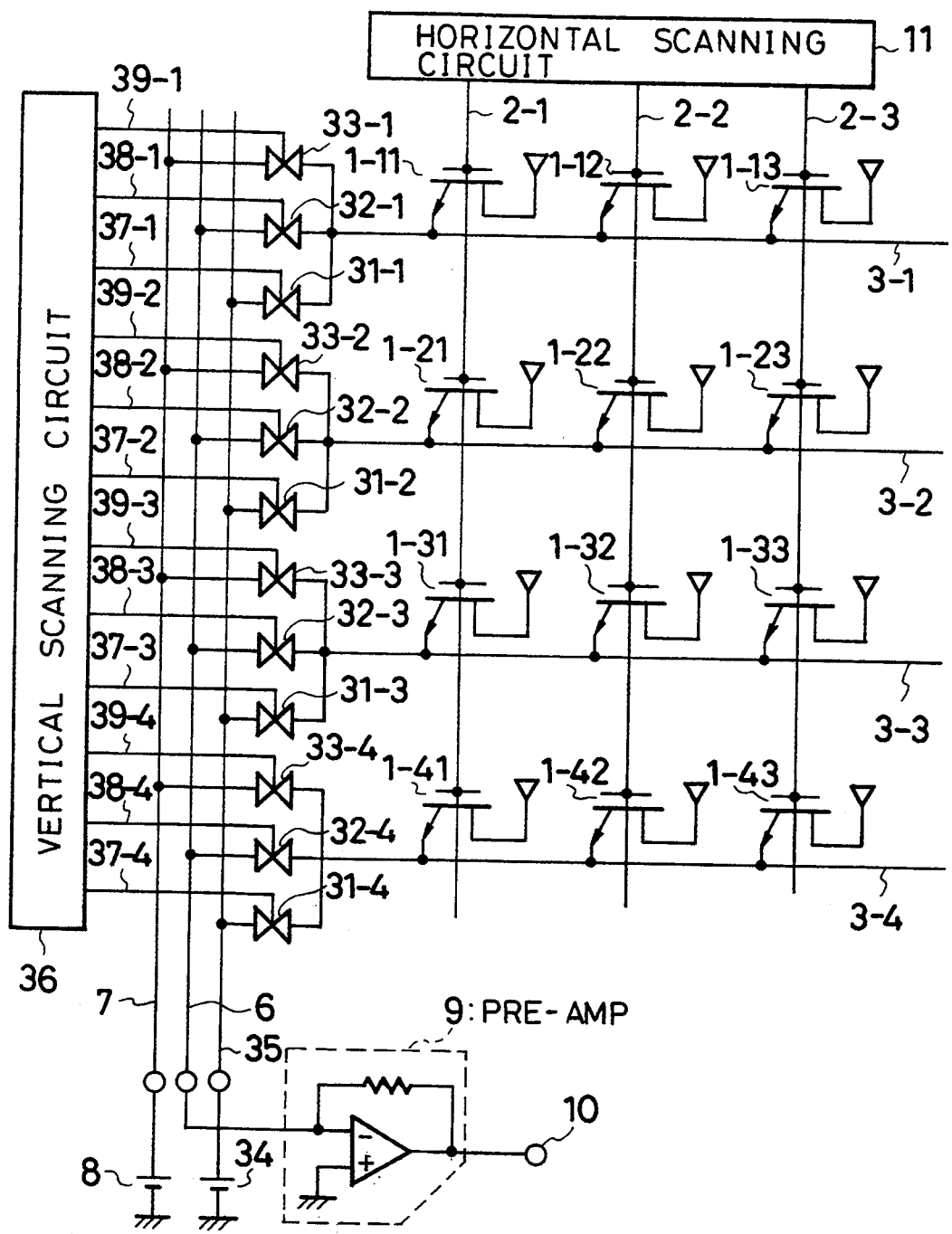
FIG. 7 is a circuit diagram showing a third embodiment.

Next, FIG. 7 is a circuit diagram showing a third embodiment of the present invention. An arrangement of third embodiment will be explained below with reference FIG. 7. This embodiment is intended to provide overflow operation, and components having the same or identical functions as those in the above first embodiment are denoted by the same reference numerals.

As with the first embodiment, CMDs 1-11, 1-12, ..., 1-43 constituting respective pixels are arranged in the form of a 3×4 matrix, and a not-shown video bias $V_{DD}$ ($>0$) is commonly applied to respective drains of the CMDs. Respective gate terminals of a group of CMDs in each column arrayed in the Y-direction are commonly connected to corresponding one of column lines 2-1, 2-2, 2-3, whereas respective source terminals of a group of CMDs in each row arrayed in the X-direction are commonly connected to corresponding one of row lines 3-1, 3-2, 3-3, 3-4. The row lines 3-1, ..., 3-4 are commonly connected to an overflow reference line 35, in turn connected to a power supply 34 for overflow, through overflow switches 31-1, 31-2, 31-3, 31-4, respectively, to a signal line 6 through signal readout switches 32-1, 32-2, 32-3, 32-4, respectively, and further to a reset line 7, in turn connected to a power supply 8 for resetting, through reset switches 33-1, 33-2, 33-3, 33-4, respectively. The signal line 6 is connected to a current-voltage conversion type preamplifier 9 with its input terminal virtually grounded, so that a video signal of negative polarity is time-serially read out at an output terminal 10 of the preamplifier 9.

Meanwhile, the column lines 2-1, 2-2, 2-3 are connected to a horizontal scanning circuit 11 and applied with signals $\Phi_{G1}$, $\Phi_{G2}$, $\Phi_{G3}$, respectively. Control terminals of the signal readout switches 32-1, ..., 32-4 are connected to control signal lines 38-1, 38-2, 38-3, 38-4 from a vertical scanning circuit 36, and applied with signals $\Phi_{S1B}$, $\Phi_{S2B}$, $\Phi_{S3B}$, $\Phi_{S4B}$ respectively. Control terminals of the reset switches 33-1, ..., 33-4 are connected to control signal lines 39-1, 39-2, 39-3, 39-4 from the vertical scanning circuit 36, and applied with signals $\Phi_{S1C}$, $\Phi_{S2C}$, $\Phi_{S3C}$, $\Phi_{S4C}$ respectively. Further, control terminals of the overflow switches 31-1, ..., 31-4 are connected to control signal lines 37-1, 37-2, 37-3, 37-4 from the vertical scanning circuit 36, and applied with signals $\Phi_{S1A}$, $\Phi_{S2A}$, $\Phi_{S3A}$, $\Phi_{S4A}$ respectively. The CMDs are formed on the same substrate which is applied with substrate voltage $V_{SUB}$.

Figure 8:
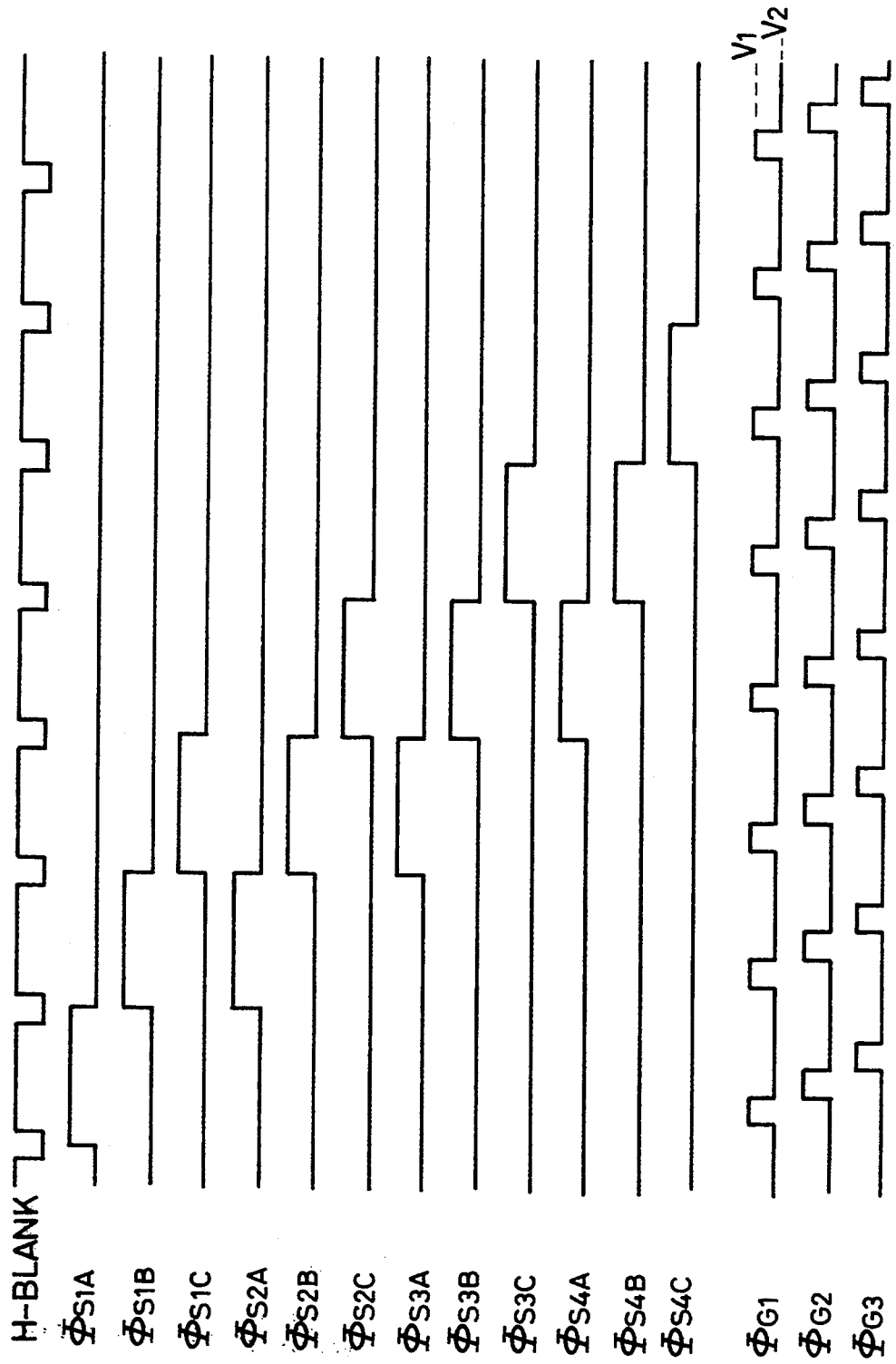
FIG. 8 is a chart of signal waveforms for explaining operation of the solid state imaging device in FIG. 7.

FIG. 8 is a chart of signal waveforms for explaining operation of the third embodiment shown in FIG. 7. The signals $\Phi_{G1}$, $\Phi_{G2}$, $\Phi_{G3}$ applied to the column lines 2-1, 2-2, 2-3 each comprise column select voltage $V_1$ and column non-select voltage $V_2$. For the row line 3-1, the signal readout switch 32-1 is turned on during only a period in which the signal $\Phi_{S1B}$ is at a high level, so that the row line 3-1 is connected to the signal line 6 to become the GND potential, whereas it is turned off during a period in which the signal $\Phi_{S1B}$ is at a low level. On the other hand, the reset switch 33-1 is turned on during only a period in which the signal $\Phi_{S1C}$ is at a high level, so that the row line 3-1 is connected to the reset line 7 to become the same potential as potential $V_R$ given by the power supply 8 for resetting, whereas it is turned off during a period in which the signal $\Phi_{S1C}$ is at a low level. Further, the overflow switch 31-1 is turned on during only a period in which the signal $\Phi_{S1A}$ is at a high level, so that the row line 3-1 is connected to the overflow reference line 35 to become the same potential as potential $V_0$ given by the power supply 34 for overflow, whereas it is turned off during a period in which the signal $\Phi_{S1A}$ is at a low level.

By way of example, when the signal $\Phi_{S1A}$ shifts from a low level to a high level in one horizontal blanking period, the overflow switch 31-1 is turned on and the row line 3-1 takes, through the switch 31-1 and the overflow reference line 35, the same potential as the potential $V_0$ given by the power supply 34 for overflow. Therefore, the source terminals of the CMD pixels 1-11, 1-12, 1-13 connected to the row line 3-1 become $V_0$. Afterward, when the signal $\Phi_{G1}$ shifts from the column non-select voltage $V_2$ to the column select voltage $V_1$, a potential difference of $V_1 - V_0$ is produced between gate and source of the CMD pixel 1-11. By setting the potential difference $V_1 - V_0$ thus produced equal to the potential of the overflow voltage $V_{OF}$ in the prior art shown in FIGS. 1 and 2, for example, extra electric charges uselessly integrated in the CMD pixel 1-11 are discharged. As a result, there can be obtained a blooming suppression effect equivalent to that obtainable with the invention disclosed in Japanese Patent Laid-Open No. 61-136388 which has been proposed by the applicant of this application.

In the subsequent horizontal blanking period, the signal $\Phi_{S1A}$ shifts from a high level to a low level, whereupon the overflow switch 31-1 is turned off to disconnect the row line 3-1 from the overflow reference line 35. At the same time, the signal readout switch 32-1 is turned on and the row line 3-1 is connected through the switch 32-1 and the signal line 6 to the preamplifier 9 with its input terminal virtually grounded. Therefore, the potential of the row line 3-1 takes 0V so that the source terminals of the CMD pixels 1-11, 1-12, 1-13 connected to the row line 3-1 become the GND potential. Afterward, when the signal $\Phi_{G1}$ shifts from the column non-select voltage $V_2$ to the column select voltage $V_1$, a potential difference of $V_1$ is produced between gate and source of the CMD pixel 1-11. By setting the potential difference $V_1$ thus produced equal to the potential of the readout gate voltage $V_{RD}$ in the prior art shown in FIGS. 1 and 2, a signal current like that in the prior art is allowed to flow through the CMD pixel 1-11.

Meanwhile, of the CMD pixels connected to the row line 3-1, the gates of the CMD pixels 1-12, 1-13 other than the CMD pixel 1-11 are applied with the column non-select voltage $V_2$, thereby producing potential $V_2$ between gates and sources of the CMD pixels 1-12, 1-13 other than the CMD pixel 1-11. Accordingly, by setting the potential $V_2$ thus produced equal to the potential of the integrating voltage $V_{INT}$ in the prior art shown in FIGS. 1 and 2, the CMD pixels 1-12, 1-13 are cut off and no current flows through the CMDs constituting those pixels in a like manner to the prior art. As a result, only the signal current from the CMD pixel 1-11 is taken out to the signal line 6 through the row line 3-1. In addition, as with the foregoing overflow operation, since the signal $\Phi_{S2A}$ shifts to a high level in this horizontal scanning period, the CMD pixels 1-21, 1-22, 1-23 connected to the row line 3-2 are successively subjected to the overflow operation for discharging the extra electric charges which are useless.

When the signal $\Phi_{S1B}$ is changed from a high level to a low level in the subsequent horizontal blanking period, the signal readout switch 32-1 is turned off to disconnect the row line 3-1 from the signal line 6 of potential 0. At the same time, the signal $\Phi_{S1C}$ changes from a low level to a high level, whereupon the reset switch 33-1 is turned on and the row line 3-1 is connected to the power supply 8 through the reset line 7. Therefore, the source terminals of the CMD pixels 1-11, 1-12, 1-13 connected to the row line 3-1 at their sources take the potential $V_R$. Simultaneously, the signal $\Phi_{S2B}$ changes from a low level to a high level, whereupon the signal readout switch 32-2 is turned on and the row line 3-2 is connected through the signal line 6 to the preamplifier 9 with its input terminal virtually grounded. As a result, the source potentials of the CMD pixels 1-21, 1-22, 1-23 commonly connected to the row line 3-2 at their sources become 0V. Further, at the same time, the signal $\Phi_{S3A}$ changes from a low level to a high level, whereupon the overflow switch 31-3 is turned on and the row line 3-3 takes the potential $V_0$ given by the power supply 34 for overflow.

Following that, when the signal $\Phi_{G1}$ shifts from the column non-select voltage $V_2$ to the column select voltage $V_1$, a potential difference of $V_1 - V_R$ is produced between gate and source of the CMD pixel 1-11. By setting the potential difference $V_1 - V_R$ thus produced equal to the reset voltage $V_{RST}$ in the prior art shown in FIGS. 1 and 2, signal charges in the form of holes integrated below a gate electrode of the CMD pixel 1-11 are discharged and the CMD pixel 1-11 is reset similarly to the prior art. On the other hand, the CMD pixel 1-21 connected to the row line 3-2 and selected by the column select pulse $\Phi_{G1}$ outputs a signal current depending on the exposure amount to the signal line 6 through the row line 3-2 and the switch 32-2 in a like manner to the above. Also, the CMD pixel 1-31 connected to the row line 3-3 and selected by the column select pulse $\Phi_{G1}$ is subjected to the overflow operation for discharging the extra electric charges which are useless, in a like manner to the above. Then, when the signal $\Phi_{G1}$ shifts from the column select voltage $V_1$ to the column non-select voltage $V_2$ and the signal $\Phi_{G2}$ shifts from the column non-select voltage $V_2$ to the column select voltage $V_1$, the CMD pixel 1-12 is reset, a signal from the CMD pixel 1-22 is outputted to the signal line 6, and the CMD pixel 1-32 is subjected to the overflow operation. After that, the similar operation will be repeated successively.

When the signal $\Phi_{S2B}$ is changed from a high level to a low level in another subsequent horizontal blanking period, the signal readout switch 32-2 is turned off to disconnect the row line 3-2 from the signal line 6 of potential 0. At the same time, the signal $\Phi_{S2C}$ changes from a low level to a high level, whereupon the reset switch 33-2 is turned on and the row line 3-2 is connected to the power supply 8 through the reset line 7. Therefore, the source terminals of the CMD pixels 1-21, 1-22, 1-23 connected to the row line 3-2 at their sources take the potential $V_R$. Simultaneously, the signal $\Phi_{S3B}$ changes from a low level to a high level, whereupon the signal readout switch 32-3 is turned on and the row line 3-3 is connected through the signal line 6 to the preamplifier 9 with its input terminal virtually grounded. As a result, the source potentials of the CMD pixels 1-31, 1-32, 1-33 commonly connected to the row line 3-3 at their sources become 0V.

Following that, when the signal $\Phi_{G1}$ shifts from the column non-select voltage $V_2$ to the column select voltage $V_1$, a potential difference of $V_1-V_R$ is produced between gate and source of the CMD pixel 1-21. By setting the potential difference $V_1-V_R$ thus produced equal to the reset voltage $V_{RST}$ in the prior art shown in FIGS. 1 and 2, signal charges in the form of holes integrated below a gate electrode of the CMD pixel 1-21 are discharged and the CMD pixel 1-21 is reset. Simultaneously, the signal $\Phi_{S4A}$ shifts to a high level so that the overflow switch 31-4 is turned on and the row line 3-4 takes the potential $V_0$ given by the power supply 34 for overflow. Therefore, a potential difference of $V_1-V_0$ is produced between gate and source of the CMD pixel 1-41. By setting the potential difference $V_1-V_0$ thus produced equal to the potential of the overflow voltage $V_{OF}$ in the prior art shown in FIGS. 1 and 2, as slated before, extra electric charges uselessly integrated below a gate electrode of the CMD pixel 1-41 are discharged, thus bringing the CMD pixel 1-41 into the overflow operation. On the other hand, the CMD pixel 1-31 connected to the row line 3-3 and selected by the column select pulse $\Phi_{G1}$ outputs a signal current depending on the exposure amount to the signal line 6 through the row line 3-3 and the switch 32-3 in a like manner to the above. After that, the similar operation will be repeated successively.

Because the above overflow operation is point-sequentially performed for the CMD pixels associated with one row line during one horizontal scanning period, the resulting power consumption makes a difference from that in the overflow operation according to the invention disclosed in Japanese Patent Laid-Open No. 61-136388 which has been proposed by the applicant of this application. For example, assuming that the average consumed power for each CMD pixel during the overflow operation is $P_U$, the horizontal scanning period is $t_H$, the horizontal blanking factor is $\alpha$, the number of vertical pixels in the imaging device is $N_V$ and the number of horizontal pixels therein is $N_H$, an amount of energy consumed with the overflow operation in one horizontal scanning period by using the method of Japanese Patent Laid-Open No. 61-136388 is given by:

$$(N_H \times N_V) \cdot P_U \cdot \alpha \cdot t_H$$

On the other hand, an amount of energy consumed by the method of this embodiment is given by:

$$N_H \times P_U \times t_H \times (1-\alpha)/N_H = P_U \cdot (1-\alpha) \cdot t_H$$

Thus, the ratio of power consumption between the prior art and this embodiment is given by:

$$(1-\alpha)/(N_H \times N_V \times \alpha)$$

Using such typical values as $N_H=780$, $N_V=500$ and $\alpha=0.117$, by way of example, the above ratio gives $-94$dB. It is thus found that this embodiment is very effective in reducing the power consumption of the imaging device.

According to this embodiment, with such an arrangement that gates of CMD pixels in each column arrayed in the Y-direction are commonly connected to corresponding one of column lines for horizontal scanning of the column lines, whereas sources of CMD pixels in each row arrayed in the X-direction are commonly connected to corresponding one of row lines for vertical scanning of the row lines, the reset operation of signal charges, the signal readout operation and the overflow operation are all point-sequentially performed. Consequently, periods of time integrating the signal charges becomes uniform for the pixels at any positions within the imaging device, so that a good video signal can be obtained with very excellent anti-blooming property, while remarkably reducing the power consumption.

Figure 9:
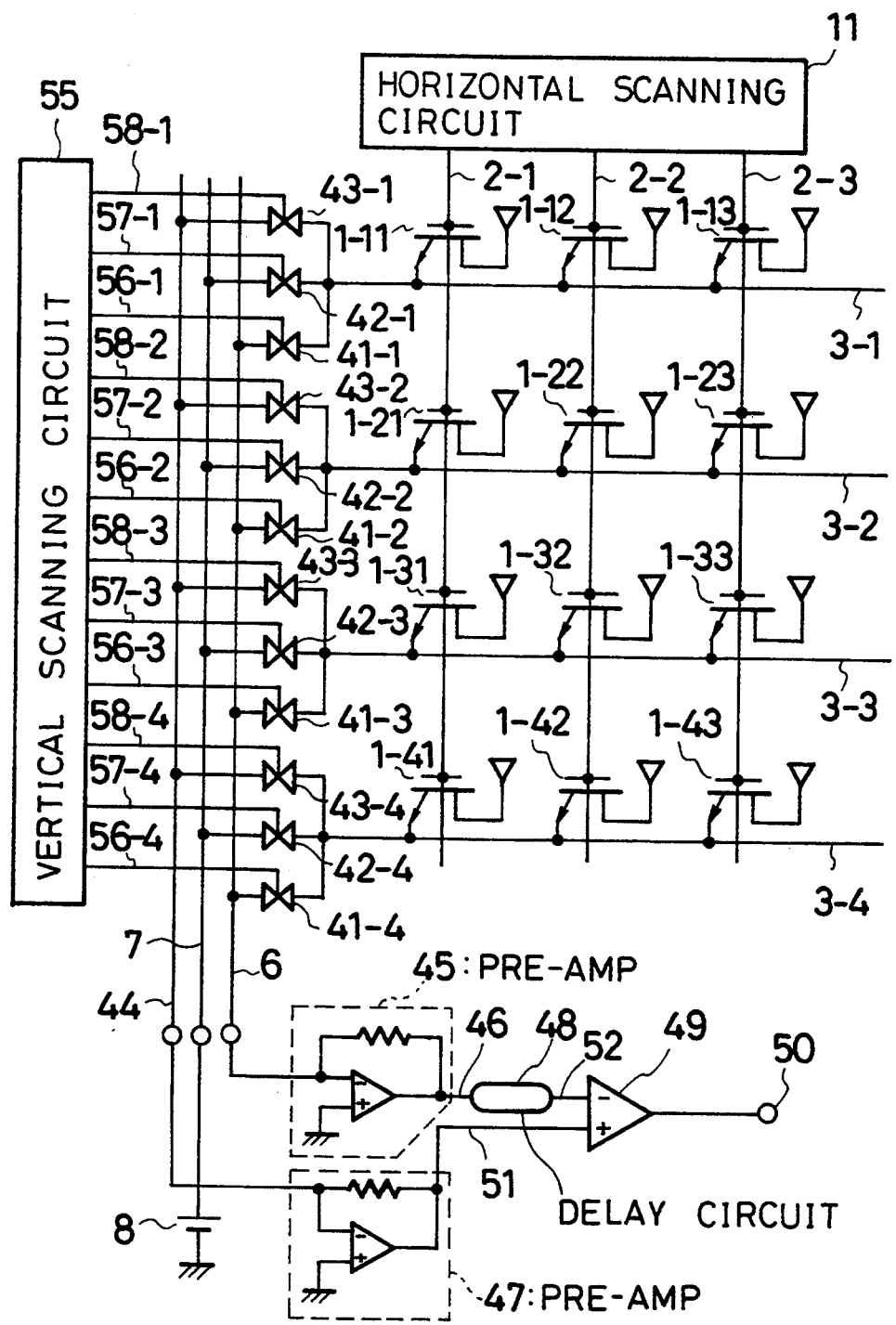
FIG. 9 is a circuit diagram showing a fourth embodiment.

FIG. 9 is a circuit diagram showing a fourth embodiment of the present invention. An arrangement of the fourth embodiment will be explained below with reference to FIG. 9. This embodiment is intended to reduce a fixed pattern noise, and components having the same or identical functions as those in the above first embodiment shown in FIG. 3 are denoted by the same reference numerals.

First, CMDs 1-11, 1-12, ..., 1-43 constituting respective pixels are arranged in the form of a matrix, and a not-shown video bias $V_{DD}(>0)$ is commonly applied to respective drains of the CMDs. Respective gate terminals of a group of CMDs in each column arrayed in the Y-direction are commonly connected to corresponding one of column lines 2-1, 2-2, 2-3, whereas respective source terminals of a group of CMDs in each row arrayed in the X-direction are commonly connected to corresponding one of row lines 3-1, 3-2, 3-3, 3-4. The row lines 3-1, ..., 3-4 are commonly connected to a signal line 6 through signal readout switches 41-1, 41-2, 41-3, 41-4, respectively, to a reset line 7, in turn connected to a power supply 8 for resetting, through reset switches 42-1, 42-2, 42-3, 42-4, respectively, and further to an offset readout line 44 through offset readout switches 43-1, 43-2, 43-3, 43-4, respectively. The signal line 6 is connected to a current-voltage conversion type preamplifier 45 with its input terminal virtually grounded, so that a video signal of negative polarity is time-serially read out at an output terminal 46 of the preamplifier 45. Also, the offset readout line 44 is connected to a current-voltage conversion type preamplifier 47 with its input terminal virtually grounded. An output of the preamplifier 45 is applied to a differential amplifier 49 through a delay circuit 48 for delaying the output by two horizontal scanning periods, whereas an output of the preamplifier 47 is directly applied to the differential amplifier 49. Then, a video signal free of a dark offset output for each pixel is time-serially read out from an output terminal 50 of the differential amplifier 49.

Meanwhile, the column lines 2-1, 2-2, 2-3 are connected to a horizontal scanning circuit 11 and applied with signals $\Phi_{G1}$, $\Phi_{G2}$, $\Phi_{G3}$, respectively. Control terminals of the signal readout switches 41-1, 41-2, 41-3, 41-4 are connected to control signal lines 56-1, 56-2, 56-3, 56-4 from a vertical scanning circuit 55, and applied with signals $\Phi_{S1A}$, $\Phi_{S2A}$, $\Phi_{S3A}$, $\Phi_{S4A}$ respectively. Control terminals of the reset switches 42-1, 42-2, 42-3, 42-4 are connected to control signal lines 57-1, 57-2, 57-3, 57-4 from the vertical scanning circuit 55, and applied with signals $\Phi_{S1B}$, $\Phi_{S2B}$, $\Phi_{S3B}$, $\Phi_{S4B}$ respectively. Further, control terminals of the offset readout switches 43-1, 43-2, 43-3, 43-4 are connected to control signal lines 58-1, 58-2, 58-3, 58-4 from the vertical scanning circuit 55, and applied with signals $\Phi_{S1C}$, $\Phi_{S2C}$, $\Phi_{S3C}$, $\Phi_{S4C}$ respectively. The CMDs are formed on the same substrate which is applied with substrate voltage $V_{SUB}$.

FIG. 10 is a chart of signal waveforms for explaining operation of the fourth embodiment shown in FIG. 9. The signals $\Phi_{G1}$, $\Phi_{G2}$, $\Phi_{G3}$ applied to the column lines 2-1, 2-2, 2-3 each comprise column select voltage $V_1$ and column non-select voltage $V_2$. For the row line 3-1, the signal readout switch 41-1 is turned on during only a period in which the signal $\Phi_{S1A}$ is at a high level, so that the row line 3-1 is connected to the signal line 6 to become the GND potential, whereas it is turned off during a period in which the signal $\Phi_{S1A}$ is at a low level. On the other hand, the reset switch 42-1 is turned on during only a period in which the signal $\Phi_{S1B}$ is at a high level, so that the row line 3-1 is connected to the reset line 7 to become the same potential as potential $V_R$ given by the power supply 8 for resetting, whereas it is turned off during a period in which the signal $\Phi_{S1B}$ is at a low level. Further, the offset readout switch 43-1 is turned on during only a period in which the signal $\Phi_{S1C}$ is at a high level, so that the row line 3-1 is connected to the offset readout line 44 to become the GND potential, whereas it is turned off during a period in which the signal $\Phi_{S1C}$ is at a low level.

By way of example, when the signal $\Phi_{S1A}$ shifts from a low level to a high level in one horizontal blanking period, whereupon the signal readout switch 41-1 is turned on and the row line 3-1 is connected through the switch 41-1 and the signal line 6 to the current-voltage conversion type preamplifier 45 with its input terminal virtually grounded. Therefore, the potential of the row line 3-1 takes 0V so that the source terminals of the CMD pixels 1-11, 1-12, 1-13 connected to the row line 3-1 become the GND potential. Afterward, when the signal $\Phi_{G1}$ shifts from the column non-select voltage $V_2$ to the column select voltage $V_1$, a potential difference of $V_1$ is produced between gate and source of the CMD pixel 1-11. By setting the potential difference $V_1$ thus produced equal to the potential of the readout gate voltage $V_{RD}$ in the prior art shown in FIGS. 1 and 2, a signal current like that in the prior art is allowed to flow through the CMD pixel 1-11. Meanwhile, of the CMD pixels connected to the row line 3-1, the gates of the CMD pixels 1-12, 1-13 other than the CMD pixel 1-11 are applied with the column non-select voltage $V_2$, thereby producing potential $V_2$ between gates and sources of the CMD pixels 1-12, 1-13 other than the CMD pixel 1-11. Accordingly, by setting the potential $V_2$ thus produced equal to the potential of the integrating voltage $V_{INT}$ in the prior art shown in FIGS. 1 and 2, the CMD pixels 1-12, 1-13 are cut off and no current flows through the CMDs constituting those pixels in a like manner to the prior art. As a result, only the signal current from the CMD pixel 1-11 is taken out to the signal line 6 through the row line 3-1. Thereafter, in response to state transition of the signals $\Phi_{G2}$, $\Phi_{G3}$, signals from the CMD pixels 1-12, 1-13 are successively taken out to the signal line 6.

When the signal $\Phi_{S1A}$ is changed from a high level to a low level in the subsequent horizontal blanking period, the signal readout switch 41-1 is turned off to disconnect the row line 3-1 from the signal line 6 of potential 0. At the same time, the signal $\Phi_{S1B}$ changes from a low level to a high level, whereupon the reset switch 42-1 is turned on and the row line 3-1 is connected to the power supply 8 through the reset line 7. Therefore, the source terminals of the CMD pixels 1-11, 1-12, 1-13 connected to the row line 3-1 at their sources take the potential $V_R$. Simultaneously, the signal $\Phi_{S2A}$ changes from a low level to a high level, whereupon the signal readout switch 41-2 is turned on and the row line 3-2 is connected through the signal line 6 to the preamplifier 45 with its input terminal virtually grounded. As a result, the source potentials of the CMD pixels 1-21, 1-22, 1-23 commonly connected to the row line 3-2 at their sources become 0V.

Following that, when the signal $\Phi_{G1}$ shifts from the column non-select voltage $V_2$ to the column select voltage $V_1$, a potential difference of $V_1-V_R$ is produced between gate and source of the CMD pixel 1-11. By setting the potential difference $V_1-V_R$ thus produced equal to the reset voltage $V_{RST}$ in the prior art shown in FIGS. 1 and 2, signal charges in the form of holes integrated below a gate electrode of the CMD pixel 1-11 are discharged and the CMD pixel 1-11 is reset similarly to the prior art. On the other hand, the CMD pixel 1-21 connected to the row line 3-2 and selected by the column select pulse $\Phi_{G1}$ outputs a signal current depending on the exposure amount to the signal line 6 through the row line 3-2 and the switch 41-2 in a like manner to the above. Then, when $\Phi_{G1}$ shifts from the column select voltage $V_1$ to the column non-select voltage $V_2$ and $\Phi_{G2}$ shifts from the column non-select voltage $V_2$ to the column select voltage $V_1$, the CMD pixel 1-12 is reset and a signal from the CMD pixel 1-22 is outputted to the signal line 6. After that, the similar operation will be repeated successively.

When the signal $\Phi_{S2A}$ is changed from a high level to a low level in another subsequent horizontal blanking period, the signal readout switch 41-2 is turned off to disconnect the row line 3-2 from the signal line 6 of potential 0. At the same time, the signal $\Phi_{S2B}$ changes from a low level to a high level, whereupon the reset switch 42-2 is turned on and the row line 3-2 is connected to the power supply 8 through the reset line 7. Therefore, the source terminals of the CMD pixels 1-21, 1-22, 1-23 connected to the row line 3-2 at their sources take the potential $V_R$. Simultaneously, the signal $\Phi_{S3A}$ changes from a low level to a high level, whereupon the signal readout switch 41-3 is turned on and the row line 3-3 is connected through the signal line 6 to the preamplifier 45 with its input terminal virtually grounded. As a result, the source potentials of the CMD pixels 1-31, 1-32, 1-33 commonly connected to the row line 3-3 at their sources become 0V. Following that, when the signal $\Phi_{G1}$ shifts from the column non-select voltage $V_2$ to the column select voltage $V_1$, a potential difference of $V_1-V_R$ is produced between gate and source of the CMD pixel 1-21. By setting the potential difference $V_1-V_R$ thus produced equal to the reset voltage $V_{RST}$ in the prior art shown in FIGS. 1 and 2, signal charges in the form of holes integrated below a gate electrode of the CMD pixel 1-21 are discharged and the CMD pixel 1-21 is reset. On the other hand, the CMD pixel 1-31 connected to the row line 3-3 and selected by the column select pulse $\Phi_{G1}$ outputs a signal current depending on the exposure amount to the signal line 6 through the row line 3-3 and the switch 41-3 in a like manner to the above.

Further, at the same time the signal $\Phi_{S3A}$ is changed from a low level to a high level, the signal $\Phi_{S1C}$ also changes from a low level to a high level, whereupon the offset readout switch 43-1 is turned on and the row line 3-1 is connected through the offset readout line 44 to the preamplifier 47 with its input terminal virtually grounded. Therefore, the source potentials of the CMD pixels 1-11, 1-12, 1-13 commonly connected to the row line 3-1 at their sources become 0V. At this time, since the CMD pixel 1-11 connected to the row line 3-1 and selected by the column select pulse $\Phi_{G1}$ has been reset before one horizontal scanning period, the CMD pixel 1-11 outputs an offset current depending on the exposure amount 0 to the offset readout line 44 through the row line 3-1 and the switch 43-1. Then, when $\Phi_{G1}$ shifts from the column select voltage $V_1$ to the column non-select voltage $V_2$ and $\Phi_{G2}$ shifts from the column non-select voltage $V_2$ to the column select voltage $V_1$, the CMD pixel 1-22 is reset, a signal depending on the exposure amount at the CMD pixel 1-32 is outputted to the signal line 6, and further an offset current depending on the exposure amount 0 at the CMD pixel 1-12 is outputted to the offset readout line 44. After that, the similar operation will be repeated successively.

Accordingly, an offset output corresponding to the dark output is delivered to the output terminal 51 of the preamplifier 47 with a delay of two horizontal scanning periods from the output which corresponds to the exposure amount and is obtained at the output terminal 46 of the preamplifier 45. Thus, by applying the signal obtained at the output terminal 46 to the delay circuit 48 for delaying an input by two horizontal scanning periods, and then applying both an output 52 of the delay circuit 48 and the offset signal obtained at the output terminal 51 to the differential amplifier 49, only a signal component depending on the exposure amount at each pixel is taken out from the output terminal 50 of the preamplifier 49, while removing the dark offset output for each pixel.

According to this embodiment, with such an arrangement that gates of CMD pixels in each column arrayed in the Y-direction are commonly connected to corresponding one of column lines for horizontal scanning of the column lines, whereas sources of CMD pixels in each row arrayed in the X-direction are commonly connected to corresponding one of row lines for vertical scanning of the row lines, both the reset operation of signal charges and the signal readout operation are point-sequentially performed. Consequently, periods of time integrating the signal charges becomes uniform for the pixels at any positions within the imaging device, so that a good video signal can be obtained. Further, with this embodiment including an offset signal readout mechanism, it is possible to suppress an influence of fluctuations in the dark offset output as a main cause of the fixed pattern noise which has been a severe problem in amplification type image sensors such as CMDs.

While the foregoing embodiments have been explained as applying the present invention to a solid state imaging device using CMDs as pixels, the present invention can also be of course applicable to any other type solid state imaging device using like photoelectric transducers, e.g., AMI type photoelectric transducers, as pixels other than the solid state imaging device using CMDs as pixels, with the result of a similar operating advantage.

As described above in connection with the embodiments, according to the present invention, since both the readout and reset operation for each pixel are point-sequentially performed, it is possible to easily provide a solid state imaging which can make periods of integrating time for all the pixels on the imaging device.

What is claimed is:

1. A solid state charge modulation device type imaging device including, as pixel constituting elements, image sensors in each of which a source-drain current is modulated depending on an amount of electric charges produced under light irradiation and integrated below a gate electrode, and comprising:
    a pixel group prepared by arraying said pixels in the form of a matrix,
    a plurality of row lines to each of which are commonly connected sources of those pixels arrayed in the X-direction for each row,
    a plurality of column lines to each of which are commonly connected gates of those pixels arrayed in the Y-direction for each column,
    a horizontal scanning circuit for sequentially delivering a drive signal to said column lines,
    a vertical scanning circuit for delivering first, second and third signals to sequentially drive first switching elements through each of which said row lines are each connected to a signal output line, second switching elements through each of which said row lines are each connected to a reset line applied with reset potential, and third switching elements through each of which said row lines are each connected to an offset readout line, and
    means for delaying a readout signal over said signal output line by two horizontal scanning periods, and then outputting a differential signal between said delayed readout signal and a dark offset signal read out to said offset readout line,
    both said scanning circuits being arranged such that after said vertical scanning circuit delivers a drive signal for one of said first switching elements, said horizontal scanning circuit is driven to sequentially read out pixel signals from the respective pixels on one predetermined row line; one of said second switching elements connected to another row line, from which pixel signals have been read out one horizontal scanning period before the readout for said predetermined row line, is driven to sequentially reset the respective pixels connected to another said row line upon the driving of said horizontal scanning circuit; and one of said third switching elements connected to still another row line, from which pixel signals have been read out two horizontal scanning periods before the read for said predetermined row line, is driven to sequentially read out dark offset signals of the respective pixels connected to still another said row line upon the driving of said horizontal scanning circuit, wherein said pixel signals are non-destructively read out in real-time.

* * * * *